Jan. 21, 1930.  E. C. NEUENDORF  1,744,279
BULLETPROOF GUARD CAGE
Filed April 22, 1929
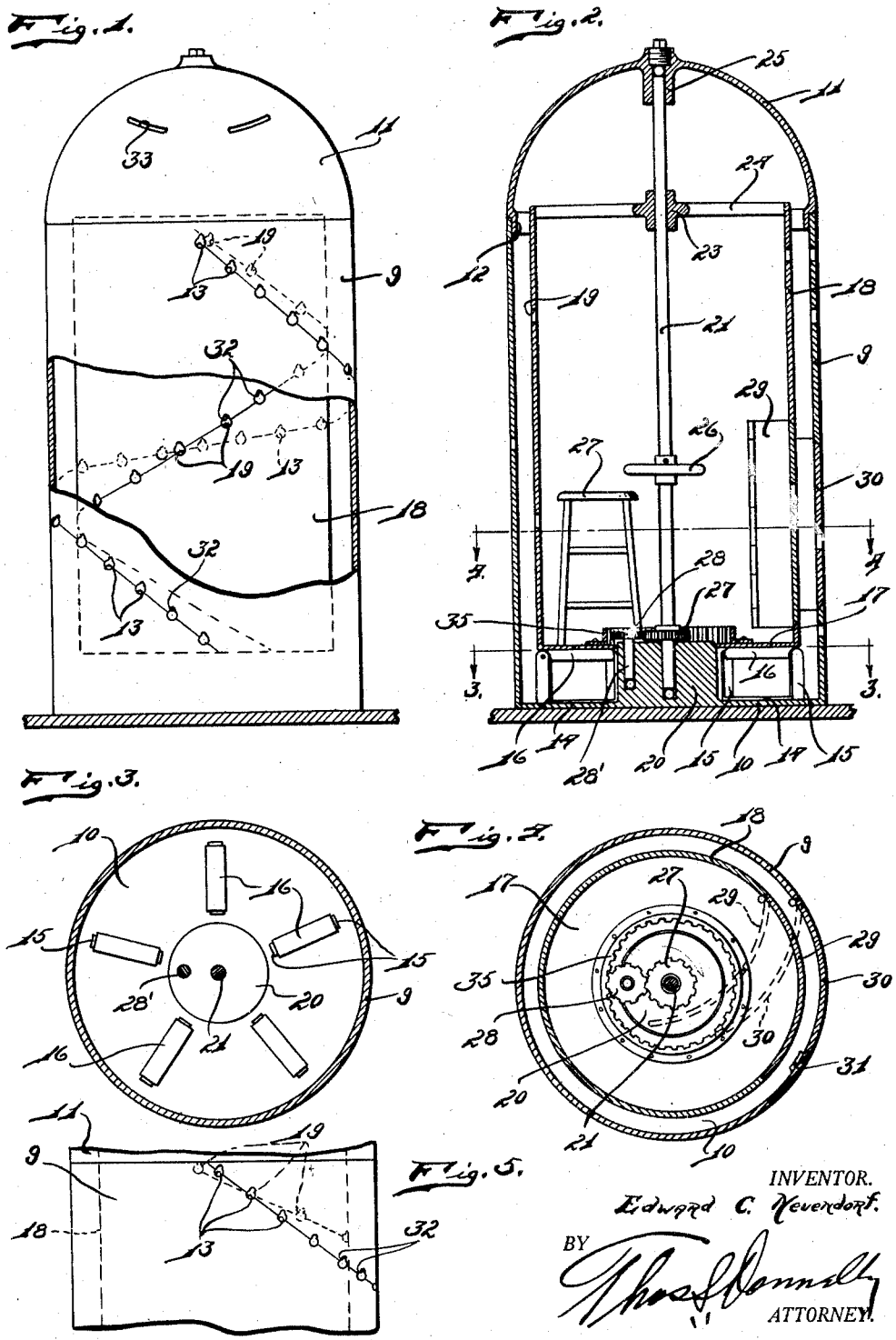
INVENTOR.
Edward C. Neuendorf.
BY
ATTORNEY.

Patented Jan. 21, 1930

1,744,279

UNITED STATES PATENT OFFICE

EDWARD C. NEUENDORF, OF WYANDOTTE, MICHIGAN

BULLETPROOF GUARD CAGE

Application filed April 22, 1929. Serial No. 356,968.

My invention relates to a new and useful improvement in a bullet proof guard cage and has for its object the provision of a guard cage in which a guard may be positioned so as to observe the room or other premises which it is his duty to protect, while at the same time, he may be protected from the observation of those about him.

Another object of the invention is the provision of a cage of this class in which the guard may be positioned and protected from bullets from the outside, while at the same time he may be able to shoot from the interior of the cage.

Another object of the invention is the provision of a guard cage of this class consisting of an outer casing having a plurality of spirally arranged rows of openings and having an inner cylindrical casing mounted therein provided with a single spirally arranged row of openings, so that upon rotating the inner casing, each of the holes of the outer casing may be brought into registration with one of the holes in the inner casing, only one of these holes registering at the same time.

Another object of the invention is the provision of a guard cage of this class which will be simple in structure, economical of manufacture and highly efficient in use.

Other objects will appear hereinafter.

The invention consists in the combination and arrangement of parts hereinafter described and claimed.

The invention will be best understood by a reference to the accompanying drawings, which form a part of this specification, and in which, Fig. 1 is a side elevational view of the invention with parts broken away and parts shown in section.

Fig. 2 is a central vertically sectional view of the invention.

Fig. 3 is a sectional view taken on line 3—3 of Fig. 2.

Fig. 4 is a sectional view taken on line 4—4 of Fig. 2.

Fig. 5 is a fragmentary view similar to Fig. 1.

As shown in the drawings, the invention comprises a bullet proof cylindrical casing 9 having a base 10 and provided with a removable dome 11, this dome having a downwardly projecting flange 12 which serves to telescope with the upper edge of the cylindrical casing 9. Formed in the casing 9 are a plurality of spirally arranged rows of openings 13. Mounted on the inner surface of the bottom 10 are standards 14 in which is rotatably mounted a roller 16. Positioned on the roller 16 is the bottom 17 of an inner bullet proof cylindrical casing 18 having a single spirally arranged row of openings 19, the spiral of this row being at a different angle than the spiral of the rows of openings 13 and the spacing of the holes being different so that upon a rotation of the casing 18, one of the openings 19 may be brought into registration with one of the openings 13 at a time, the arrangement of the openings 19 in the casing 18 being such that upon a rotation of the casing 18 in the casing 9 each of the rows 13 may at one time or another be brought into registration with one of the openings 19, as shown in Fig. 5.

Projecting upwardly from the bottom 10 is a bearing 20 in which is mounted one end of the shaft 21. The shaft 21 projects upwardly and is journalled in a bearing 23 formed in the arms 24 which extend angularly from the upper edge of the casing 18 and provide a spider. The upper end of the shaft 21 engages in a bearing 25 which depends from the upper surface of the dome 11.

Fixedly mounted on the shaft 21 is a handwheel 26. Fixedly mounted upon the shaft 21 is a gear 27 adapted to mesh with the gear 28 mounted on the shaft 28' which is journalled in the bearing 20, the gear 28 meshing with the ring gear 35 which is fastened to the floor 17 of the casing 18. The rotation of the shaft 21 through the gears 27, 28 and 35 will rotate the casing 18 relatively to the casing 9. The casing 18 is provided with an inwardly swinging door 29 and the casing 9 is provided with a door 30 which may be swung inwardly and moved into the casing 18 by means of the handle 31 or hinged as desired, the door 29 being larger than the door 30.

It will be noted that there is a space between the periphery of the casing 18 and the inner surface of the casing 9, this space being small enough so that when one of the openings 19 is brought into registration with one of the openings 13 through a relative rotation of the casings 9 and 18, a pistol barrel may be projected through the openings, and, as shown in Fig. 1, these openings are each provided with the bulged portion 32, through which the sight of the pistol barrel may be projected, the bulged portion serving, when the pistol barrel is in the opening, to provide a peep hole through which the guard may observe those on the exterior.

With a guard cage of this class, the guard in a place where valuables are kept, and particularly in banks and the like, is protected at all times from bullets and bandits, etc., while at the same time, he has the means of protecting the bank and its occupants from bandits, etc.

If desired, the casings 9 and 18 may be made from bullet proof glass which would be transparent, so that the operator could observe those around him without necessitating his observation of his surroundings through the registering holes 19 and 13.

The dome 11 is provided with slits 33 whereby ventilation may be had.

The device is one which may be mounted in any location in a building and is believed to be one which is durable in its structure, while at the same time, it is economical to manufacture.

While I have illustrated and described the preferred form of my invention, I do not wish to limit myself to the precise detail of structure shown but desire to avail myself of such variations and modifications as come within the scope of the appended claims.

Having thus described my invention, what I claim as new and desire to secure by Letters Patent is:

1. A guard cage of the class described comprising: an outer casing; an inner casing rotatable in said outer casing and spaced therefrom, each of said casings having spirally arranged openings formed therein, the rotation of said inner casing relatively to said outer casing bringing the openings of said casings into registration with each other singly.

2. A guard cage of the class described comprising: an outer casing; an inner casing rotatably mounted in said outer casing, said casings having spirally arranged holes formed therein; means for rotating said inner casing, the rotation of said inner casing bringing the holes formed therein singly into registration with the holes formed in said outer casing, the complete rotation of said inner casing effecting a registration of all of the holes therein with the holes in said outer casing.

3. A guard cage of the class described comprising: an outer casing having a plurality of spirally arranged holes formed therein; an inner casing rotatably mounted therein having a plurality of holes spirally arranged therein; means accessible from said inner casing for rotating the same, the rotation of said inner casing effecting a registration of its holes with the holes in said outer casing singly.

4. A guard cage of the class described comprising: an outer casing having a plurality of spirally arranged holes formed therein; an inner casing rotatably mounted therein having a plurality of holes spirally arranged therein; means accessible from said inner casing for rotating the same, the rotation of said inner casing effecting a registration of its holes with the holes in said outer casing singly; a door in said outer casing; and a door in said inner casing in registration with the door in said outer casing.

5. A guard cage of the class described comprising: an outer casing having a plurality of spirally arranged holes formed therein; an inner casing rotatably mounted therein having a plurality of holes spirally arranged therein; means accessible from said inner casing for rotating the same, the rotation of said inner casing effecting a registration of its holes with the holes in said outer casing singly; and roller bearing means for supporting said inner casing in said outer casing.

In testimony whereof I have signed the foregoing specification.

EDWARD C. NEUENDORF.